United States Patent [19]

Russ et al.

[11] 4,024,075
[45] May 17, 1977

[54] CARBON AND EROSION-RESISTANT CATALYST

[75] Inventors: Karl J. Russ, Louisville, Ky.; Donald R. Broughton, Lanesville, Ind.

[73] Assignee: Catalysts and Chemicals Inc., Louisville, Ky.

[22] Filed: July 25, 1975

[21] Appl. No.: 598,755

[52] U.S. Cl. .......................... 252/466 J; 48/214 A
[51] Int. Cl.$^2$ ..................... B01J 21/04; B01J 23/74
[58] Field of Search ............... 252/466 J; 48/214 A; 423/651, 652

[56] References Cited

UNITED STATES PATENTS

| 2,665,979 | 1/1954 | Taussig | 423/651 X |
| 3,650,713 | 3/1972 | Chinchen et al. | 252/466 J |
| 3,894,963 | 7/1975 | Gerdes et al. | 252/466 J |

FOREIGN PATENTS OR APPLICATIONS

| 923,385 | 4/1963 | United Kingdom | 252/466 J |

*Primary Examiner*—W. J. Shine
*Attorney, Agent, or Firm*—Wm. R. Price

[57] ABSTRACT

A carbon and erosion resistant catalyst is provided for simultaneously converting hydrocarbons with steam and carbon dioxide to produce hydrogen and carbon monoxide while simultaneously reducing carbon dioxide to carbon monoxide in order to produce a reducing atmosphere. The catalyst consists of a cobalt component on an aluminous support, the aluminous support being aluminum oxide in the alpha phase and having a surface area of greater than .5 m$^2$/gm. but not greater than 14 m$^2$/gm. This catalyst is sufficiently active to convert the hydrocarbons to hydrogen and carbon monoxide at a relatively low initial temperature and within a relatively large temperature range and simultaneously reduce carbon dioxide to carbon monoxide in the carbon forming range without appreciable deposition of carbon on the catalyst or without catalyst erosion.

2 Claims, No Drawings

CARBON AND EROSION-RESISTANT CATALYST

FIELD OF THE INVENTION

This invention relates to an improved carbon and erosion-resistant catalyst for use in the production of reducing atmospheres. More specifically, this invention relates to a specific cobalt-containing catalyst supported on an alpha alumina carrier which is characterized by specific surface area and a specific pore volume. The invention relates to the use of a catalyst under carbon-forming conditions for reducing carbon dioxide in spent reducing gas to carbon monoxide and for converting added hydrocarbons to hydrogen and carbon monoxide through reaction with steam and carbon dioxide at extremely low steam to gas ratios. This invention provides a catalyst for the high temperature reaction between steam and carbon dioxide with the inlet gases at very low steam to gas molar ratios with no carbon formation or catalyst degradation as compared with conventional reforming catalyst. Further, the catalyst of this invention has a high reforming catalytic activity with up to 30 parts per million of hydrogen sulfide in the feed gas and is not sensitive to sulfur poisoning.

DESCRIPTION OF THE PRIOR ART

The use of cobalt catalysts in the reforming of hydrocarbons to produce hydrogen and carbon monoxide through the reaction of said hydrocarbons with steam or carbon dioxide is well known. This was disclosed at least as early as 1933 by Young, Hanks and Freyermuth in U.S. Pat. Nos. 1,904,592 and 1,904,593. Further, Riblett, in U.S. Pat. No. 2,220,849 suggested the use of a two-stage catalyst bed in which the first stage contained a cobalt catalyst and the second contained a nickel catalyst. According to Riblett, sulfur combined with the cobalt catalyst in the first stage to form cobalt sulfide while the nickel catalyst in the second stage of the reactor completed the reforming reaction. Generally, however, aside from Riblett's suggestion of the use of cobalt in sulfur-bearing streams, the patent literature treated the cobalt and nickel catalysts as essentially equivalent. Note, for example the comparison by Woodhouse in U.S. Pat. No. 1,959,189, page 2, lines 35 through 47.

"For example, nickel alone, as ordinarily prepared, shows substantially no conversion at low steam ratios while as the steam:methan ratio increases to about 3.5 to 1, the activity of the nickel rises to a maximum, resulting for a given temperature and pressure, in say, approximately 50% conversion. On the other hands, as the steam ratio is raised from 3.5:1 to, say, 6:1, the activity of the nickel drops in some instances the conversion being ten percent or lower. Cobalt acts in much the same way, having its maximum activity at a somewhat higher steam ratio, viz. in the neighborhood of 4.5:1".

SUMMARY OF THE INVENTION

We have found, despite the teachings of equivalent activities in the prior art, that the cobalt catalysts are not equivalent to the nickel catalysts in the presences of high concentrations of carbon monoxide, carbon dioxide and methane at relatively low reforming temperatures in the range of from 1000° to 1600° F. This is particularly true in the presence of sulfur contaminants in the gas streams. It is also particularly true at low steam to gas ratios such as are practiced in accordance with this invention. We have found, for example, that at steam to gas ratios of less than 1:1 and in the neighborhood of .13:1 to .18:1 that nickel catalysts having sufficient activity to carry out the steam hydrocarbon reaction at satisfactory conversion levels form carbon in unacceptable amounts and erode excessively. The degradation and erosion of the nickel catalyst is not observed if the catalyst has such a small concentration of nickel or is of such activity that the desired conversion does not occur. In other words, in order to achieve the activity desired at these low steam to gas ratios, the catalysts experience heavy carbon formation and excessive and extreme physical degradation. We have found, however, that by the use of cobalt on a specific alpha alumina carrier that sufficiently high activity is obtained at these low steam to gas ratios without carbon formation and without catalyst erosion and degradation. The type of carrier is extremely critical in that a surface area of less than 0.5 m²/gm. does not produce sufficiently active catalysts for the desired conversion level. conversely, an aluminum oxide of higher surface area is too active and promotes carbon formation and catalyst degradation. Thus, the catalyst suitable for use in this process, comprises a cobalt component supported on an aluminum oxide support in which the aluminum oxide is in the alpha phase and which has a surface area in excess of 0.5 m²/gm. and no greater than 14 m²/gm. The pore volume and the pore distribution on the carrier appears also to be quite important to the proper activity and to the proper anti-carbon and anti-erosion characteristics desired.

DESCRIPTION OF THE PREFERRED EMBODIMENT

Steam is used, as is known, to control the relative proportions of the monoxide and dioxide through the reaction $$CO + H_2O \rightleftharpoons CO_2 + H_2$$

so that the Boudouard reaction $$2CO \rightleftharpoons CO_2 + C$$

is prevented from moving to the right and causing carbon deposits and catalyst blockages. Elevation of temperature pushes the water gas shift reaction to the left, resulting in reduction of carbon dioxide to the monoxide. This, at low steam concentrations, tends to push the Boudouard reaction to the right.

The use of reducing gases, comprising essentially equal portions of carbon monoxide and hydrogen, for reduction produces $CO_2$ and $H_2O$ through oxidation of $H_2$ and $CO$. This increase in the concentration of $H_2O$ and $CO_2$ is undesirable from an equilibrium consideration of the desired reaction.

Therefore, the $H_2O$ is removed from the reducing gas and the resulting mixture of $CO_2$, $H_2$ and $CO$ is recycled for the production of additional reducing gas. This spent reducing gas, after removal of steam therefrom, is admixed with a hydrocarbon reforming constituent, such as methane or other hydrocarbon, and the gas mixture is then admixed with steam and passed over a catalyst for production of hydrogen and CO according to the classical hydrocarbon - steam reforming reaction $$CH_4 + H_2O \rightleftharpoons CO + 3H_2$$

or through the reaction $$CH_4 + CO_2 \rightleftharpoons CO + 2H_2O$$

Elevation of temperatures pushes the water gas shift reaction to the left $$CO + H_2O \rightleftharpoons CO_2 + H_2$$

thus producing additional carbon monoxide through the reduction of carbon dioxide. This places the process in the carbon forming range.

We have found that the carrier exerts a rather critical effect upon the activity and durability of the catalyst. It is of course important that the support be sufficiently strong and rugged to withstand the rigorous conditions of the relatively high temperature reforming reaction. This is particularly true due to the carbon forming propensity of the constituents especially at low steam to gas ratios.

Our experiences have shown, however, that the carrier must have a surface area in excess of 0.5 m$^2$/gm. in order to provide proper activity. The alumina carrier may be formed in any of the conventional shapes. It may be in the form of tablets, extrusions, cylinders or rings. After forming, the alumina carrier is heat treated at temperatures in the range of 1500° F. to 3500° F. for periods of 2 to 24 hours, preferably in the range of 2400 to 2700° F. for 2 to 5 hours. It is important that the catalyst is not overheated so as to prevent reducing the surface area of the finished catalyst to less than 0.5 m$^2$/gm. In the preferred state, the physical properties of the heat treated carrier are:

| | |
|---|---|
| Surface area | .5 to 14 m$^2$/gm. |
| Pore volume (greater than 29.5A) | .10 – .30 cc/gm. |
| H$_2$O adsorption | 12 to 17 percent by weight |

The cobalt constituent is deposited on the carrier by immersing the heat treated alumina in a solution of a water soluble cobalt salt. The water soluble salt of cobalt must have a cation which will not poison the eventual catalyst. Preferred cations are the nitrates, acetates, or carbonates. The impregnated catalyst is calcined at 700° to 1200° F. for periods of 2 to 16 hours to convert the cobalt compound to the oxide. The dipping and calcination procedures are repeated until the desired level of cobalt concentration on the finished catalyst is obtained. While a cobalt concentration of between 3 and 25% is effective, the preferred cobalt concentration is as follows:

| | |
|---|---|
| Cobalt (expressed as the metal) | 10 to 15 percent |
| Al$_2$O$_3$ | 82 to 86 percent |
| Surface area | .5 to 14 m$^2$/gm, crush strength 150 pounds average DWL |
| Pore volume (greater than 29.5A) | 0.10 to 0.20 cc. per gram |

We have found that utilizing commercial alpha alumina supports having a surface area of less than 0.5 squar meters per gram and having a different pore diameter distribution than that of the preferred carrier, that the catalyst is insufficiently active to reform hydrocarbons under the conditions required in the process.

This will be further illustrated with reference to the examples.

TEST CONDITIONS

While the catalysts of this invention are active at temperatures as low as 800° F. and in excess of 1800° F. and at several atmospheres pressure, all of the tests hereinafter referred to were performed under essentially the following conditions.

| | |
|---|---|
| Pressure | Atmospheric |
| Temperature | 1000° – 1600° F. |
| Inlet steam to gas ratio | 0.13 – 0.18 |
| Theoretical hydrogen space velocity | 2030 – 2060 |
| Feed gas composition (mole percent) | |
| CH$_4$ | 26.0 – 28.4 |
| CO | 19.5 – 22.7 |
| CO$_2$ | 16.8 – 18.9 |
| H$_2$ | 32.8 – 35.3 |
| Sulfur H$_2$S | 0. – 30 ppm |

As is well known, commercial reforming reactors are made up of externally fired elongated high temperature metal tubes containing the active reforming catalyst. The gases are brought into the reactor through a pre-heat portion of the reactor wherein the temperature is raised rapidly up to reaction temperature of from 1600° to 1800° F. Since the reaction is highly endothermic and since the gases normally have to be heated, the temperature throughout the reactor is not identical, but may range from portion to portion several hundred degrees. Accordingly, since these conditions are impossible to simulate in the laboratory, the test reactions were run in isothermal reactors at temperatures of 1000, 1200, 1400, and 1600° F. This then, would simulate the temperature conditions found at any point in the adiabatic catalytic reactor, utilized commercially.

In particular tests referred to, the reactor is a six-foot length of two-inch internal diameter INCONEL pipe. The reactor is a down-flow design. The steam and feed gas supply enter at the top of the reactor, pass through a pre-heat section containing heated ceramic beads and thereafter through the catalyst section and thence outwardly through a ceramic heater to exit. After exiting from the reactor, the wet gases were passed through a condensor and separated to eliminate the water and the dry gases were metered by a wet test meter.

EXAMPLE 1

A commercial alumina support material having a surface area of from 0.1 – 0.3 m$^2$/gm. was immersed in a solution of nickel nitrate containing 16.6 grams of nickel per 100 cc. The saturated supports were calcined at 1000° F. for 3 hours. This procedure was repeated until the final nickel concentration of the catalyst was 9.02 percent nickel. The carrier material was characterized by having an alpha phase crystalline structure and a surface area less than 0.3 m$^2$/gm. This catalyst was designated as catalyst A.

EXAMPLE 2

A second catalyst was prepared by sequential immersions and calcinations of a fired alumina carrier having a surface area of from 0.5 to 3 m$^2$/gm into a nickel nitrate solution similar to that of Example 1. This procedure was repeated until the nickel concentration, expressed as the metal was 12.6 percent. This required four dips and a final calcination to convert the nitrate to the oxide. This catalyst was designated as catalyst B.

EXAMPLE 3

A third catalyst C was prepared by dipping a support identical to that of Example 2 in a nickel nitrate solution until the final nickel concentration (expressed as the metal) was measured at 7 percent. This carrier material is characterized as follows:

| | |
|---|---|
| Surface area | .5 – 3 m²/gm |
| Pore volume (greater than 29.5 A) | .10 – .30 cc. per gram |
| Water adsorption | 12 – 17 percent by weight. |

These catalysts were tested under the standard conditions previously indicated and with 30 parts per million $H_2S$ in the feed gas, Catalyst A leaked, 16.1 percent of methane at 1600° F. There was no carbon formation and the catalyst physically appeared to be in excellent shape and was clean from extraneous carbon. However, the conversion level was completely unacceptable.

The Catalyst B containing 12.6 percent nickel on the support of this invention had a leakage of only 3.5 percent of methane at 1600° F. However, there was some carbon formation on the catalyst and 20 percent of the catalyst fell apart and completely disintegrated. The indentical catalyst under the same conditions, but without hydrogen sulfide in the gas stream, leaked only 0.28 percent methane at 1600° F., but there was heavy carbon formation and ⅔ of the catalyst completely disintegrated when it was removed from the reactor.

The test for catalyst C, containing 7 percent nickel, on the support of this invention, resulted in a methane leakage at 1600° F. of 1.8, which is well within satisfactory range. However, there was carbon formation. Since these catalysts tests were for a limited time duration, any carbon on the catalyst was considered an unsatisfactory commercial material.

EXAMPLE 4

The carrier of this invention, in the form of alumina rings, was immersed in a solution of nickel nitrate containing 16.6 grams of nickel per 100 cc. These saturated rings were calcined at 1000° F. for 3 hours. The procedure was repeated for a total of four dips. The nickel concentration of the finished catalyst, expressed as metal was 12.9 percent nickel. This catalyst was designated as catalyst D.

EXAMPLE 5

The identical alumina rings were immersed in a solution of cobalt nitrate and calcined at 1000° for 3 hours. The procedure was repeated for a total of three dips in the cobalt nitrate solution. The cobalt content of the finished catalyst, expressed as the metal, was 12.4 percent cobalt. This catalyst was designated as Catalyst E.

The summary of catalytic activity test results is shown with the feed gas containing no hydrogen sulfide in Table 1. Table 2 shows the activity test with 20 to 30 parts per million $H_2S$ in the feed gas.

TABLE I

| | | | | ACTIVITY TEST RESULTS - NO $H_2S$ IN FEED | | | | | | | | |
|---|---|---|---|---|---|---|---|---|---|---|---|---|
| | | | | Inlet | | | | Outlet | | | | |
| Catalyst | S/G | THSV | Temp. | %CH₄ | %CO | %CO₂ | %H₂ | %CH₄ | %CO | %CO₂ | %H₂ | Comments |
| D Ni 12.9 % | .13 | 2060 | 1000 | 28.4 | 19.5 | 16.8 | 35.3 | 24.8 | 16.0 | 20.0 | 37.0 | Heavy carbon, 65% of catalyst went to powder. |
| | | | 1200 | | | | | 10.0 | 26.2 | 9.1 | 53.4 | |
| | | | 1400 | | | | | 1.7 | 32.4 | 4.4 | 59.5 | |
| | | | 1600 | | | | | .28 | 34.2 | 2.7 | 60.0 | |
| D Ni 12.9 % | .18 | 2030 | 1000 | 26.5 | 22.7 | 18.9 | 31.9 | 28.5 | 14.2 | 22.3 | 35.0 | Catalyst made carbon. |
| | | | 1200 | | | | | 9.6 | 27.2 | 12.7 | 50.5 | |
| | | | 1400 | | | | | 2.0 | 33.7 | 6.2 | 58.1 | |
| | | | 1600 | | | | | .24 | 24.6 | 4.1 | 61.1 | |
| E Co 12.4 % | .13 | 2060 | 1000 | 26.1 | 21.9 | 18.8 | 33.2 | 33.1 | 14.0 | 22.3 | 30.6 | No carbon on catalyst. |
| | | | 1200 | | | | | 14.3 | 28.2 | 11.4 | 46.1 | |
| | | | 1400 | | | | | 3.3 | 34.4 | 3.5 | 58.8 | |
| | | | 1600 | | | | | .41 | 37.5 | 1.3 | 60.8 | |
| E Co 12.4 % | .18 | 2030 | 1000 | 27.3 | 19.8 | 18.2 | 32.8 | 28.2 | 12.9 | 25.7 | 33.2 | No carbon on catalyst. No erosion. |
| | | | 1200 | | | | | 12.1 | 26.3 | 15.9 | 45.7 | |
| | | | 1400 | | | | | 2.2 | 33.8 | 8.2 | 55.8 | |
| | | | 1600 | | | | | 0.33 | 34.6 | 4.9 | 60.2 | |

TABLE II

| | | | | ACTIVITY TEST RESULTS - 20-30 PPM $H_2S$ IN FEED GAS | | | | | | | | | |
|---|---|---|---|---|---|---|---|---|---|---|---|---|---|
| | | | | Inlet Gas | | | | | Outlet Gas | | | | |
| Catalyst | S/G | THSV | °F. Temp. | %CH | %CO | %CO₂ | %H₂ | ppm $H_2S$ | %CH₄ | %CO | %CO₂ | %H₂ | Comments |
| D Ni 12.9% | 0.18 | 2030 | 1000 | 29.8 | 17.8 | 14.9 | 37.5 | 30 | 22.1 | 13.3 | 21.3 | 43.3 | 20% catalyst to powder. Carbon on catalyst |
| | | | 1200 | | | | | | 13.7 | 21.7 | 13.7 | 50.9 | |
| | | | 1400 | | | | | | 7.5 | 28.9 | 7.6 | 56.0 | |
| | | | 1600 | | | | | | 3.5 | 33.2 | 4.6 | 58.7 | |
| E Co 12.4% | 0.18 | 2030 | 1000 | 31.5 | 18.9 | 17.0 | 32.6 | 20 | 34.4 | 12.0 | 21.2 | 32.4 | Catalyst clean. No erosion |
| | | | 1200 | | | | | | 15.5 | 24.4 | 13.1 | 47.0 | |
| | | | 1400 | | | | | | 6.6 | 33.8 | 5.9 | 53.7 | |
| | | | 1600 | | | | | | 2.2 | 36.7 | 2.5 | 58.6 | |

It will be noted now referring to the Table 1, that at 1600° F. catalyst D produced heavy carbon and 65 percent of the catalyst powdered upon removal from the reactor. The methane leakage, however, at 1600° was within satisfactory limits. Nevertheless, it is quite clear that this catalyst is highly unsatisfactory at this low steam to gas ratio. Under the same conditions, but with the steam to gas ratio raised to .18:1, the methane These catalysts were tested under the same conditions as the catalysts of the previous examples and the results of these tests are shown in Table III.

TABLE III

| Catalyst | Temp. °F. | Inlet Gas | | | | Outlet Gas | | | | Comments |
|---|---|---|---|---|---|---|---|---|---|---|
| | | $CH_4$ | CO | $CO_2$ | $H_2$ | $CH_4$ | CO | $CO_2$ | $H_2$ | |
| F. 12% Co | 1000 | 28.5 | 17.7 | 17.8 | 36.0 | 28.2 | 13.2 | 23.5 | | No carbon. |
| Surface Area | 1200 | | | | | 20.5 | 21.3 | 18.2 | | No erosion. |
| 0.3 m²/gm. | 1400 | | | | | 17.9 | 23.4 | 15.5 | | |
| | 1600 | | | | | 7.0 | 32.7 | 6.7 | | |
| G. 12% Co | 1000 | 28.3 | 16.8 | 25.4 | 29.5 | 25.5 | 17.5 | 25.0 | | Light carbon. |
| 14.5 m²/gm | 1200 | | | | | 16.0 | 26.6 | 17.5 | | No erosion. |
| | 1400 | | | | | 6.1 | 32.4 | 9.6 | | |
| | 1600 | | | | | 1.1 | 36.2 | 6.0 | | | leakage was .24 and the catalyst made carbon. The physical condition of this catalyst, however, when removed from the reactor was not nearly so bad as that in the first phase of the reaction.

Referring now to catalyst E, the methane leakage of $CH_4$ at 1600° was .41 and there was no carbon on the catalyst and no sign of catalyst erosion. Raising the steam to gas ratio from 0.13 to 0.18 effected a slight improvement in methane leakage. The catalyst, however, again contained no carbon and exhibited no erosion.

Referring now to Table 2, in which the catalysts were tested under identical conditions, but with the addition of sulfur, 20 percent of catalyst D went to powder and there was considerable carbon. Again, catalyst E was completely clean with no signs of catalyst erosion upon removal from the reactor. It is quite clear that the effect of the carrier and of the catalytic metal and the synergistic effect of the two on each other is clearly demonstrated in these examples. The nickel catalyst on the low surface area, alpha alumina carrier shown in Example 1 did not have sufficient activity. Use of the nickel on a higher surface area catalyst resulted in carbon formation and catalyst degradation.

EXAMPLE 6

A commercial alpha alumina support, identical to that used in Example 1, and having a surface area of 0.3 m²/gm was immersed in a cobalt nitrate solution and calcined at 1000° F. This procedure was repeated until the cobalt concentration of the dipped and calcined carrier was 12 percent, expressed as the metal. This catalyst was designated as Catalyst F.

EXAMPLE 7

An alpha alumina carrier in the form of alumina rings and having a surface area of 14.5 m²/gm was immersed in a cobalt nitrate solution and the impregnated catalyst was calcined at 1000° F to convert the nitrate to the oxide. This procedure was repeated until the cobalt concentration, expressed as the metal, was 12%. This catalyst was designated as Catalyst G.

It will be noted that the F catalyst leaked 7.0% methane at 1600° F. but did not erode, degrade or cause carbon formation. Nevertheless, the activity of this catalyst was not within satisfactory limits.

Catalyst G on the other hand leaked only 1.1% methane at 1600° F. and did not erode or degrade. However, there was light carbon on the catalyst.

Many modifications will occur to those skilled in the art from the detailed description hereinabove given which is meant to be exemplary in scope and non-limiting except so as to be commensurate in scope with the appended claims.

We claim:

1. A catalyst for use in simultaneously reacting hydrocarbons with steam and carbon dioxide to produce hydrogen and carbon monoxide and reducing carbon dioxide to carbon monoxide at temperatures in the carbon-forming range and with steam to gas ratios of less than 1:1 which consists essentially of a cobalt oxide and an alumina support, in which
   A. said cobalt oxide, expressed as the metal, is present in a concentration of from 3 to 25 percent and
   B. said alumina support is aluminum oxide in the alpha phase having a surface area of from between 0.5 square meters per gram and 14 square meters per gram, and in which said alumina support has a pore volume expressed as pores having diameters greater than 29 A in the range of from 0.10 to 0.30 cc/gm.

2. A catalyst for use in simultaneously reacting hydrocarbons with steam and carbon dioxide to produce hydrogen and carbon monoxide and reducing carbon dioxide to carbon monoxide at temperatures in the carbon-forming range and with steam to gas ratios of less than 1:1 which consists essentially of a cobalt oxide and an alumina support, in which
   A. said cobalt oxide, expressed as the metal, is present in a concentration of from 3 to 25 percent and
   B. said alumina support is aluminum oxide in the alpha phase, having a surface area of from 0.5 square meters per gram and 14 square meters per gram and in which the water adsorption capability of the support, is in the range of from 12 to 17 percent by weight.

* * * * *